United States Patent [19]

Scragg

[11] 4,022,380
[45] May 10, 1977

[54] FLUID FLOW CONTROL VALVE

[76] Inventor: Edgar Peter Scragg, 60 Mulder St., Florida Park Extension 3, Florida, Transvaal, South Africa

[22] Filed: May 6, 1974

[21] Appl. No.: 466,934

[30] Foreign Application Priority Data

May 11, 1973 South Africa ............... 73/3210
June 4, 1973 South Africa ............... 73/3746

[52] U.S. Cl. ............... 239/68; 239/562; 137/244; 251/38; 251/45
[51] Int. Cl.² ............... F16K 21/06
[58] Field of Search ............ 137/242, 244; 251/38, 251/44, 45; 239/456, 459, 460, 68, 562

[56] References Cited

UNITED STATES PATENTS

| 1,295,250 | 2/1919 | Yeiser | 239/583 X |
| 1,711,234 | 4/1929 | Langdon | 251/45 |
| 2,181,581 | 11/1939 | Fraser | 137/244 |
| 2,833,300 | 5/1958 | Sirotek | 137/244 |

FOREIGN PATENTS OR APPLICATIONS

| 21,960 | 2/1917 | Denmark | 251/45 |
| 639,412 | 12/1936 | Germany | 251/38 |
| 900,723 | 7/1962 | United Kingdom | 251/38 |
| 1,248,367 | 9/1971 | United Kingdom | 251/38 |

Primary Examiner—Martin P. Schwadron
Assistant Examiner—Richard Gerard
Attorney, Agent, or Firm—Ladas, Parry, Von Gehr, Goldsmith & Deschamps

[57] ABSTRACT

Flushing valves of the type having a control chamber with a movable wall are disclosed, the chamber being partially emptied to cause the main valve surface and seat to separate and open the valve, and being slowly refilled to close the valve. A cleaning needle is provided which moves in the restricted inlet to the chamber to remove dirt and scale therefrom. In one form, the valve actuating element sequentially lifts a valve closure element, to which the needle is secured, from a seat to open said outlet and thereafter acts on the movable wall part to cause a reduction in the volume of said chamber and force some of its contents through the open outlet. In a further form, the actuating element pressurizes the chamber by forcing the movable wall in the direction which reduces the volume thereof. The increased pressure forces a flexible wall part of the chamber from a sealing surface to allow liquid to flow from the chamber.

6 Claims, 9 Drawing Figures

FLUID FLOW CONTROL VALVE

This invention relates to fluid flow control valves.

According to the present invention there is provided a fluid flow control valve comprising a casing, an inlet to the casing, an outlet from the casing, a chamber having a movable wall part and a fixed wall part, a restricted inlet to the chamber through one of said wall parts, a cleaning element for clearing dirt and scale from said inlet, an outlet from said chamber, a valve element normally closing said outlet, actuating means for displacing both said cleaning element and said valve element whereby said cleaning element moves in said inlet, and said outlet is opened to permit liquid to flow from said chamber and allow said movable wall part to move in the direction which reduces the volume of said chamer, and a valve seat and co-operating valve surface for controlling flow from said inlet of the casing to said outlet of the casing, said seat and surface being arranged to separate upon said movable wall part moving in said direction.

Said inlet to the chamber can be in the fixed wall part and said outlet from the chamber in the movable wall part, and the movable wall part can be aranged so as to be subjected to the pressure existing in said casing which pressure, in use, causes movable wall part to move in said direction after the outlet from the chamber is opened.

In one form of the valve, said cleaning element and said valve element are constituted by a single component.

In the preferred of the valve, it includes a flexible diaphragm the center part of which constitutes said movable wall. In this form, the valve can include a cup-shaped component of resilient material, said diaphragm constituting the base of this cup-shaped component and the rim of said component being secured to said fixed wall part.

According to another aspect of the present invention there is provided a liquid flow control valve comprising a chamber having a movable wall part, a restricted inlet to the chamber, an outlet from the chamber, means normally closing said outlet, a valve actuating element for urging said wall part in the direction which reduces the volume of said chamber thereby to expel liquid from said chamber through the outlet, and a valve surface and co-operating valve seat for controlling flow from an inlet of the valve to an outlet thereof, said seat and surface separating as said wall part moves in said direction.

According to a still further aspect of the invention there is provided a shower valve comprising a casing having an inlet and an outlet, a shower rose as the outlet, a chamber having a movable wall part, a restricted inlet to the chamber, an outlet from the chamber, a valve seat and co-operating valve closure element for normally closing said outlet, a valve actuating element for displacing the valve closure element from its seat to open said outlet, said actuating element projecting from the casing to form an accessible operating portion, stop means for limiting the distance through which the valve actuating element is able to displace the valve closure element, and a valve surface and co-operating valve seat for controlling flow from the casing inlet to the casing outlet, the seat and surface being arranged to separate as said movable wall part moves upon opening of said outlet from the chamber.

For a better understanding of the present invention reference will now be made, by way of example, to the accompanying drawings in which:

FIG. 9 is a fragmentary representation of a modification of the actuating means of the valve of FIG. 2.

Figure 1:
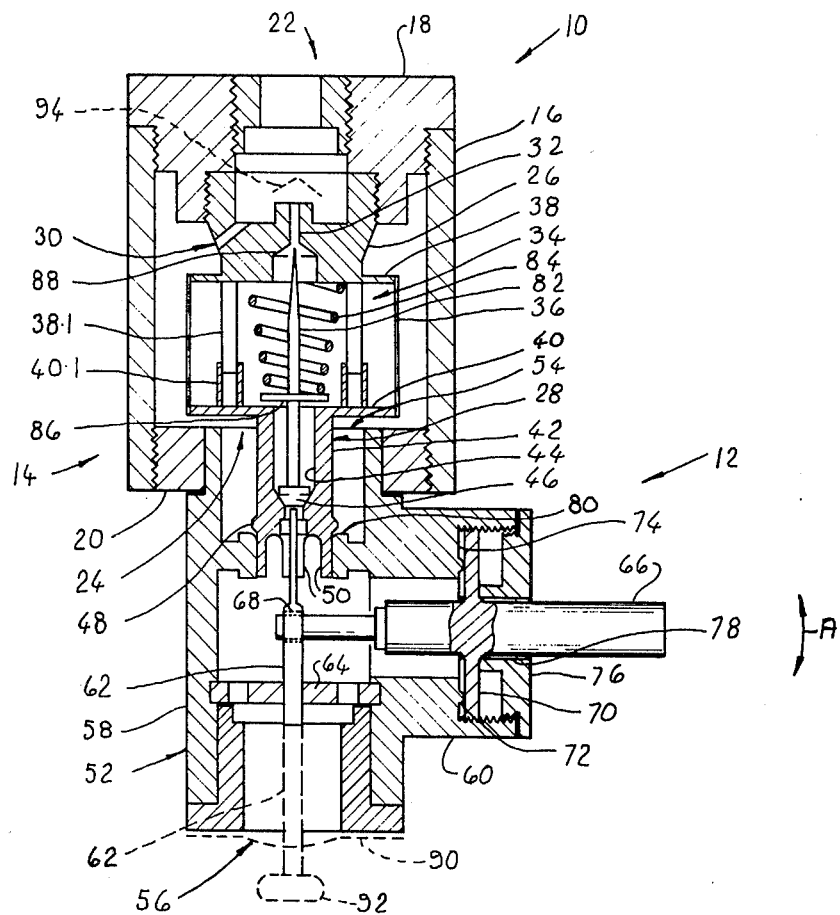
FIGS. 1 and 2 are vertical sections through two different forms of flushing valve.

The control valve illustrated in FIG. 1 is generally referenced 10 and includes an actuating means 12 to the upper end of which is secured a flushing valve 14.

The flushing valve 14 comprises a casing composed of a cylindrical body 16 to which are fitted upper and lower end caps 18 and 20. The upper end cap has centrally thereof the inlet 22 to the casing.

The actuating means 12 serves to open the flushing valve and the structure generally indicated at 24 is the closing mechanism. The closing mechanism 24 includes an upper component 26 and a lower component 28. The upper component 26 is screwed into an internally threaded bore of the cap 18 and comprises a main portion having a plurality of sloping bores 30 therein which connect the inlet 22 to the annular chamber defined by the body 16. A restricted inlet 32, referred to subsequently as a jet, extends axially through the main portion of the component 26 and serves to connect the inlet 22 to a chamber 34 which is bounded by the upper and lower components 26 and 28 and by a flexible, cylindrical wall 36 which can be plain, as shown, or bellows-like. The upper and lower components 26 and 28 are preferably of nylon and the wall 36 can be of neoprene which is cold vulcanised to the flanges 38 and 40 of the components 26 and 28.

Guide pins 38.1 project downwardly from the flange 38 and slide in sokets 40.1 projecting upwardly from the flange 40. Hence the movable wall constituted by the flange and fixed wall 40/constituted by the flange 38 are held in alignment.

The lower component 28, in addition to the flange 40, comprises a stem 42 which extends downwardly through the end cap 20. The stem has a stepped central passage 44 therethrough, a valve closure element 46 being located in the lower end of the larger diameter upper part of this passage. When seated, as it normally is, the element 46 prevents water flowing from the chamber 34. The lower part of the stem 42 includes an external, peripheral valve surface 48 and axially projecting guide fingers 50. The function of these last mentioned features will be described hereinafter.

The actuating means 12 comprises a casing 52 having an inlet 54 at the upper end thereof and an outlet 56 at the lower end thereof. The inlet and the outlet are at opposite ends of a generally cylindrical part 58 of the casing 52 which casing also includes a generally cylindrical, lateral extension 60. The stepped bore of the extension 60 opens into the bore of the casing part 58.

A stem 62 extends axially of the body part 58 and is guided at its lower end in the central aperture of a multi-apertured plate 64. At its mid portion, the stem 62 is releasably connected to a stem 66 extending axially of the lateral extension 60. The connection between the two stems is provided by providing a transverse bore 68 in the stem 62 and entering the end of the stem 66 in the bore.

Integral with the stem 66 is a diaphragm 70, these parts preferably being moulded in one piece but it being possible to machine them from a single piece of stock. The circular outer periphery of the diaphragm 70 is threaded and screwed into the larger diameter, threaded, outer end portion of the bore in the lateral extension 60. It will be noted that a raised, circular rib 72 is provided on the flat face 74 formed between the two different diameter portions of the bore in the extension 60. The diaphragm and stem unit is screwed into the extension 60 until the diaphragm 70 seats on the rib 72. A plug 76 is screwed into the bore after the diaphragm 70, this plug having a central aperture 78 which is oversized with respect to the stem 66 and which therefore allows the stem to be moved in the direction of the arrow A. The diaphragm 70 and rib 72 can be heat sealed together.

It will be noted that a valve seat 80 is provided which encircles the lower part of the inlet 54 and that the stem 62 extends upwardly through this seat to enter the passage 44 in the stem 42. While the surface 48 is in engagement with the seat 80, the flushing valve is closed. Thus the seat 80 and surface 48 control flow from the inlet 22 of the casing to its outlet.

The element 46 is at the lower end of a cleaning element in the form of a needle 82 which passes upwardly through the chamber 34, its pointed upper end being immediately below the jet 32. A coil spring 84 acts between a disc-like spring seat 86 and the component 26 to hold the element 46 against its seat in the passage 44 and re-seat it after lifting thereof. It will be noted that the jet 32 opens downwardly into a generally conical passage 88 which forms an upward extension of the chamber 34. While the needle 82 and element 46 have been described as being constituted by a single component, they could be separate components.

In the condition illustrated in FIG. 1, it will be noted that the surface 48 is in engagement with the seat 80 and the upper end of the stem 62 is spaced from the element 46 which is on its own seat. To flush the toilet to which the valve is fitted, the outer end of the stem 66 is pressed downwardly. The diaphragm 70 acts as a pivot and the end of the stem 66 which is connected to the stem 62 lifts upwardly so that the stem 62 unseats the element 46.

The interior of the cylindrical casing 16 is subjected to full main pressure and this pressure acts on the wall 36. Immediately the element 46 is lifted, the outlet from the chamber 34 is opened so that the pressure therein drops, the wall 36 then collapsing inwardly. By virtue of its connection to the cap 18, the component 26 is incapable of axial movement so that, upon collapsing of the wall 36, the lower component 28 lifts. Hence the movable wall constituted by the flange 40 moves in the direction in which the volume of the chamber 34 is reduced. The surface 48 separates from the seat 80 during such movement of the flange 40 and water commences to flow from the inlet 22, through the bores 30 to the main chamber of the flushing valve, through the cap 20, between the now spaced apart seat 48 and surface 80, into the casing 52 and out of the casing 52 via the outlet 56.

The element 46 is only unseated for a short while, the stem 66 being released immediately after operation. The outlet passage 44 from the chamer 34 is thus closed and the chamber begins to refill, water flowing into it through the jet 32. As the chamber fills, the collapsed wall 36 is extended and the component 28 moves downwardly. Eventually, the surface 48 and the seat 80 re-engage and the valve closes. The time taken for the valve to close depends on a number of factors including the resistance to water flow offered by the jet 32. By appropriate selection of the jet, it is possible to control the time taken for the valve to close.

As the element 46 lifts against the downward force exerted by the spring 84, the needle 82, guided by the tapering passage 88, slides into and through the jet 32 and clears any dirt which has lodged in the vicinity thereof or any scale which has been deposited. Hence the actuating means 12 has the dual function of simultaneously displacing both the needle 82 and the valve element 46.

As explained, the element 46 is only lifted for a short while and is then released so that the spring 84 forces it back against its seat in the passage 44. The outlet is thus closed and the chamber 34 hence begins to fill. Eventually, as the collapsed wall 36 extends, the surface 48 re-engages the seat 80 to close the valve. The spring 84, acting through the needle, assists not only in reseating the element 46 but also in closing the main valve.

As explained above, liquid flow through the valve commences when the element 46 is lifted off its seat. This means that the interior of the chamber 34 is connected, via the passage 44, to the casing 52 through which fluid is flowing. There is thus a suction effect on the chamber 34 which assists in withdrawing water from this chamber.

The wall 36 and flange 40 are subjected to pressure in the casing and it is this pressure which collapses the wall 36. However, it is possible to use a spring for this purpose and in this constructional form, the wall 36 and flange 40 do not need to be subjected to inlet pressure.

As described, the jet 32 is in the fixed chamber wall and the outlet in the movable chamber wall. However, the positions of the inlet and outlet could be interchanged.

The structure described above can be used as a shower unit simply by fitting a shower rose 90 to the outlet 56. However, it is more satisfactory if the stem 66, the lateral extension 60 and the parts within the lateral extension are omitted and the stem 62 is extended downwardly (as shown in dotted lines) to terminate in a knob 92.

The user of the unit simply presses upwardly on the knob 92 to lift the stem 62 and unseat the element 46. Water then flows through the unit and out of the unit via the shower rose until the surface 48 and seat 80 re-engage.

In the above it was stated that the dimensions of the jet 32 controlled the time lag between valve opening and valve closing. To enable a jet to be changed, the flushing valve structure must be disassembled and it is desirable to provide some means to enable the time lag to be varied without such dismantling.

It will be understood that the pressure at the inlet of the jet also has an influence on the time taken for the chamber 34 to fill sufficiently to close the valve. To enable this pressure to be varied, and hence to enable the time lag to be adjusted, it is possible to provide a cone 94 over the inlet to the jet. The cone can be guided with respect to the jet and can be connected to a rod which in turn is pivotally connected to the inner end of a crank arm. The crank arm is fast with a stud seating in a tapped bore in the wall of the structure. A locking screw can be provided, which enters said bore from outside the casing, and engages said stud. When the locking screw is removed the stud can be turned. Movement of the cone towards and away from the jet varies the pressure in the vicinity of the inlet to the jet. The cone has the additional function of deflecting away from the jet 32 dirt which might otherwise lodge in it.

While described above as a flushing valve, the valve can also be employed as a normally open control valve which can be closed when desired by a simple operation. This is achieved by so arranging the cone 94 as to create a negative pressure in the region of the inlet to the jet. The chamber 34 is thus prevented from filling and the valve remains open. When it is desired to close the valve, the cone 94 is simply displaced until a positive pressure is created at the entrance to the jet 32 whereby the chamber 34 fills and the valve closes. To re-open the valve, the cone 94 is returned to the position in which a negative pressure is created and element 46 unseated temporarily to enable the chamber 34 to empty. The valve will then remain open until the sequence of actions described is repeated. This type of structure is particularly suitable for use on water mains where it is desired that the valve remains open for virtually the whole time, the valve only being shut when the system is to be worked upon.

The valve of FIG. 2 has many features in common with the valve 10 of FIG. 1 and only those features by which the valve differs from the valve 10 will be described. Where applicable primed references have been used to designate like parts.

Dealing firstly with the inlet passage 96, this includes a lateral outer part which leads into a vertical inner part. A plug 98 in the form of a cylinder which is angularly cut-away so as to provide a flat face thereon controls flow between the parts of the passage 96. The plug 98 can be rotated so as to vary the rate of flow which is possible through the passage 96, and hence acts to cause a pressure drop between the two parts of the inlet passage.

The stem 66' in this valve is of square cross-section and passes through a central bore of similar cross-section in a rubber sleeve 100. The sleeve 100 has a circular outer periphery in which there is a groove for receiving the inner rim of the circular end wall 102 of the extension 60'. A screw 104 assists in locating the sleeve 100 and also acts as a fulcrum about which the stem pivots when its outer end is displaced upwardly or downwardly as shown by arrow A.

A screw 106 having a stepped shank co-operates with the inner end of the stem 66' to limit upward movement thereof. Adjustment of the screw 106 (after loosening of a locking nut 108) enables the movement which the stem 66' is free to perform to be varied. In the form illustrated two positions of adjustment are possible but more steps can be provided on the screw or it can be tapered to provide for infinite adjustment between maximum and minimum. It will be understood that by so limiting the movement of the stem 66', excessive deformation of the sleeve 100 can be prevented and furthermore some control can be exercised on the amount by which the element 46' is lifted from its seat. This in turn controls the amount of liquid which can flow from the chamber 34', and hence the time for which the valve remains open.

The wall and lower component 36 and 38 respectively of FIG. 1 are, in this valve, parts of a single cup-shaped component 110 which is preferably a rubber moulding. The wall of this component is referenced 36¹ and its lower component is in the form of a diaphragm 114. Around the rim of the component 110 there is a rib 112 entered in a peripheral groove of the component 26' and internally of the moulding, between the wall 36' and the shallowly frusto-conical, flexible diaphragm 114, there is a circumferentially extending strengthening fillet 116. It will be noted that because of the frusto-conical nature of the diaphragm 114, the centre region of the cup-shaped component is deeper than the region adjacent its side walls. The stem 42' extends downwardly from the diaphragm 114 and has thereon the surface 48' and, in the stepped vertical passage 44' thereof, has the seat for the element 46'. The part of the stem which is within the inlet 54' is formed with axially extending external ribs between which are flow passages.

A shallowly frusto-conical strengthening plate 118 having a central aperture through which the needle 82' passes is secured by screws 120 to the component 110. The screws enter the stem 42' from above. The plate 118 is, compared with the diaphragm 114, non-flexible. The spring 84 is replaced by a smaller spring 122 which acts between the element 46' and the lower face of the plate 118.

During normal operation of this valve, the wall 36' remains in the condition illustrated and it is the centre part of the diaphragm 114 which constitutes the movable wall. More specifically, the diaphragm 114 flexes along a circular line between the fillet 116 (which remains stationary) and the stem 42'. Thus, during opening and closing movements of the valve, the stem 42' and the part of the diaphragm 114 immediately outwardly thereof rise and fall, the outer part of the diaphragm 114, the fillet 116 and the wall 36' remaining virtually stationary. The plate 118 rises and falls with the stem 42' and thus, during opening, its outer part lifts away from the diaphragm 114. The function of this plate is to inhibit inward collapse of any peripheral part of the moulding in the region of the fillet 116. If high pressures are likely to be encountered, a short metal or plastics material cylinder can be fitted within the wall 36' to prevent it collapsing inwardly.

Figure 3:
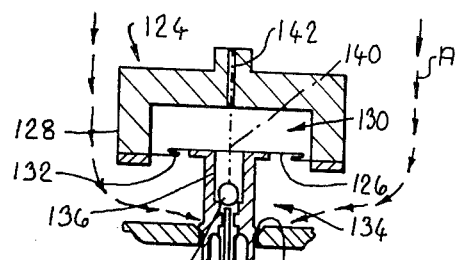
FIG. 3 is a fragmentary vertical section through a further form of flushing valve.

Turning now to FIG. 3, the valve illustrated in this figure comprises a main component 124 which is in the form of an inverted cup. The downwardly open mouth of the cup is closed by a diaphragm 126 which is connected around the periphery of the rim 128 of the component 124 thereby to form a chamber 130. The diaphragm 126 is formed with a peripherally extending pleat 132 which permits the central part of the diaphragm to move vertically under the influence of fluid pressures acting thereon. Secured to the central part of the diaphragm 126 is a component 134 which, apart from having an upper flange of smaller diameter, is substantially identical in form to the component 28 shown in FIG. 1. Hence the component 124 forms the fixed wall of the chamber 130 and the central part of the diaphragm the movable wall. Within the central passage 136 of the component 134 there is a ball 138. It will be understood that this ball can be replaced by a valve element of the form shown at 46 (see FIG. 1). A needle 140 (shown in chain dotted lines) and equivalent to the needle 82 is provided. This needle serves to clear a jet 142 provided in the component 124. A valve seat 80'' is also illustrated in this Figure; although the casing 16 and the cap 18 are not.

In use of the valve shown in FIG. 3, he stem 62'' is urged upwards to unseat the ball. The chamber 136 is thus connected to the valve outlet and the force exerted on the centre part of the diaphragm 126 by the water pressure in the main chamber of the valve displaces it upwardly so that some of the contents of the chamber are expelled through the valve outlet. Simultaneously, the component 134 lifts so that the valve surface formed thereon moves away from the seat 80''.

When the ball 138 is permitted to move to its closed position (as the stem 62'' drops) flow from the chamber 130 ceases and the chamber commences to fill via the jet 142. Eventually, the surface on the component 134 re-engages the seat 80'' and flow through the valve (which is indicated by the arrows A) ceases.

Figure 4:
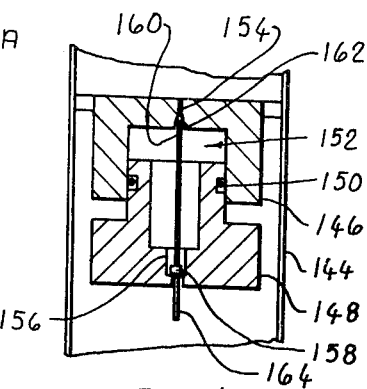
FIG. 4 is a fragmentary vertical section through yet another form of flushing valve.

The valve of FIG. 4 includes a cylindrical casing 144 within which is mounted a fixed cylinder-like component 146 and a movable piston-like component 148. The component 148 telescopes within the component 146 and an O-ring 150 is shown between the components to prevent leakage from the chamber 152 which these components define. In practice, a seal of the type known as a rolling diaphragm seal can also be employed.

A jet 154 is formed in the component 146 and forms a restricted inlet to the chamber 152. The outlet from the chamber 152 is via a passage 156 which is normally closed by a valve element 158 which engages a seat encircling the passage 156. A needle 160 extends upwardly from the element 158 and is guided by a tapering bore 162 into the jet 154. A stem 164 is provided for unseating the element 158.

When the valve element 158 is lifted, the chamber 152 is placed in communication with the valve outlet (the outlet from the passage 156 is downstream of the main valve seat but is not shown) and the pressure therein drops.

The water pressure in the valve, acting predominately upwardly on the component 148 lifts it and assists in expelling water from the chamber 152. When the valve element 158 is allowed to re-seat, the chamber commences to refill, the component 148 moves downwardly and eventually the main valve closes. Each operation of the valve causes the needle to be thrust through the jet to clear away any dirt or scale therein.

If desired, the needle can be arranged to enter and the leave the jet each time the valve operates. Alternatively, it can, when element 158 is in its closed position, still be within the jet so as to define therewith a restricted passage of annular form.

Figure 5:
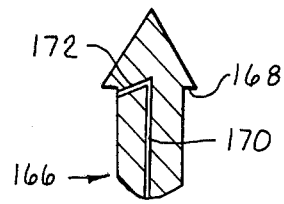
FIG. 5 illustrates a jet insert.
Figure 6:
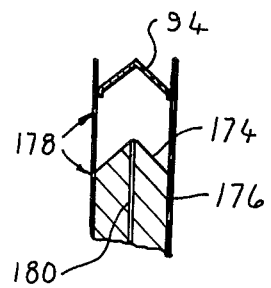
FIG. 6 illustrates an arrangement for controlling the pressure at a jet insert.

All the valves described above have a jet leading to a variable volume chamber. In all cases, the jet is shown as a simple narrow passage but, in practice, would comprise an insert having a bore of the desired length and diameter. In FIGS. 5 and 6, two forms of insert are illustrated to a larger scale. In FIG. 5, the upper end of the insert 166 is cone-shaped with an overhanging peripheral rim 168. The bore 170 of the insert does not open through the cone but is connected by a downwardly and outwardly inclined lateral passage 172 to the region beneath the overhanging rim 168. This structure minimises the chance of dirt entering the bore 170 and is particularly suitable where a constant delay time is required.

The arrangement of FIG. 6 enables the position of the cone 94 (see FIGS. 1 and 2) to be adjusted with respect to the insert 174. The circumferential edge of the cone 94 is threaded and this threading meshes with internal threading of a tube 176. Apertures 178 are formed in the tube 176 and water reaches the inlet of the bore 180 of the insert 174 through these apertures. By turning the cone 94, it can be moved towards or away from the insert 174 to close or open more of the apertures 178.

Figure 7:
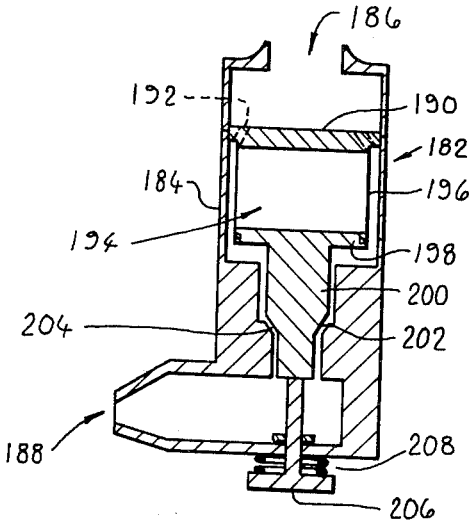
FIG. 7 is a diagrammatic vertical section through a plunger operated valve.

Turning now to FIG. 7, the flushing valve structure 182 illustrated therein comprises a casing 184 having an inlet 186 and an outlet 188. A fixed element 190 extends across the casing 184 and has a plurality of bores 192 therein through which the inlet is placed in communication with the outlet. The fixed element 190 forms the upper component of a chamber 194 which is additionally bounded by a generally cylindrical plain wall or flexible bellows 196 and a lower component 198. The component 198 is extended downwardly as a stem 200 and is formed with a peripheral valve surface 202. The valve surface 202 co-operates with a valve seat 204 formed on the casing 184.

A plunger 206 co-operates with the stem 200 and is loaded by a spring 208 in the direction away from the stem 200.

Figure 8:
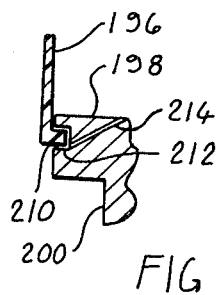
FIG. 8 is a detail, to an enlarged scale, of the valve of FIG. 7.

The bellows or wall 196 can be of neoprene and can be secured, by cold vulcanizing, to the fixed element 190. The lower periphery of the bellows or wall includes an inwardly directed rim 210 (see FIG. 8) which is entered in a peripheral recess of the lower component 198. A fine bore 214 connects the interior of the chamber 194 to the exterior thereof.

When the plunger 206 is pressed upwardly, it lifts the lower component 198. This has two effects. Firstly, the surface 202 separates from the seat 204 and water commences to flow through the valve. Secondly, the volume of the chamber 194 is decreased and hence the pressure therein is increased. The increased pressure has the effect of lifting the lower periphery of the bellows or wall 196 away from the sealing surface of component 198 on which it normally seats so that water flows from the chamber under the rim 210. Until the slow flow of water through the fine bore 214 has refilled the chamber to an extent sufficient to cause the lower component 198 to descend, the valve remains open.

As described above, the screw 106 limits the distance through which the stem 62 can displace the element 46. It will be understood that when the element 46 has been lifted to its maximum extent, flexing of the diaphragm 114 as water flows from the chamber 34 causes the stem 42 to rise until the seat for the element 46 encounters the element. Thus there is a maximum volume of water which can flow from the chamber 34 and hence the volume of water which flows through the valve each time it is operated can be predetermined. Of course, if the stem 62 is held in its raised position, then commencement of the closing sequence is delayed until this stem is allowed to drop.

Figure 2:
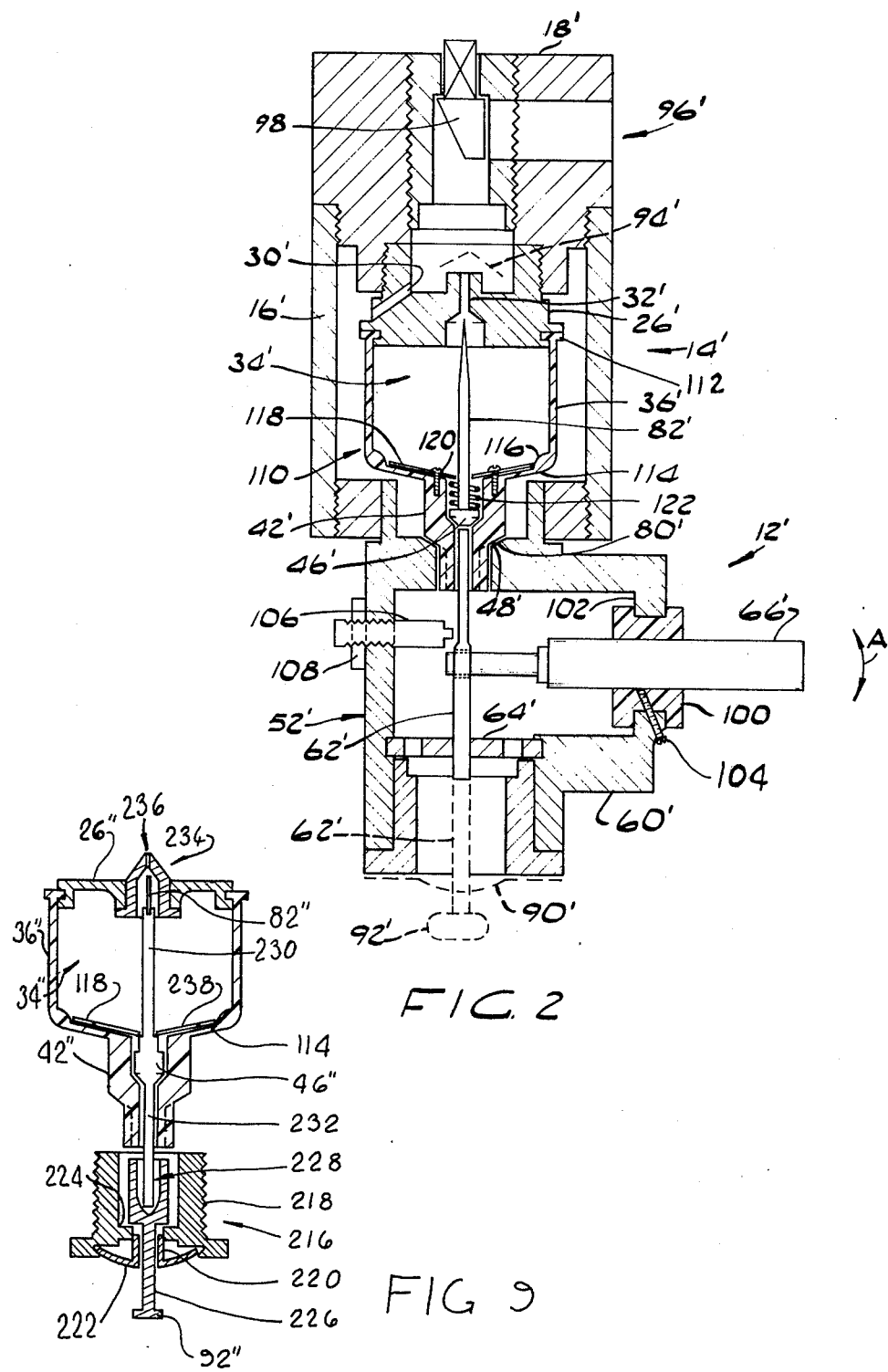

Turning now to FIG. 9, this shows the moving parts only of a modified form of the valve of FIG. 2. Where applicable, like reference numerals have been employed with the addition of double primes; and the valve is shown in the form it takes when in its shower embodiment.

The shower rose is generally referenced 216 and includes a body 218 adapted to be screwed into the lower end of the casing 52 (not shown). The central core 220 of the multi-apertured plate 222 is a press-fit in the bore of a spider 224 of the body 218. The stem 62 of FIG. 2 is, in this form, in two parts. The lower part, referenced 226, passes through the core 220 and, above the spider 224, has an enlarged upper end in which there is an upwardly open blind bore 228. The upper part of the stem is preferably a plastics moulding and includes upper and lower rod-like parts 230 and 232 between which is the element 46". The rod-like part 230 includes a threaded socket into which the needle 82" is screwed and the rod-like part 232 is a loose fit in the bore 228.

The jet insert in this embodiment is referenced 234 and is a press-fit in a bore in the upper component 26'. The insert 224 is generally cone-shaped with a fine bore 236 at its apex. By way of example, the bore can have a diameter of 0.030 inches and a length of 3/16 inches. The tip of the needle, in its lower position, can be just below the bore 236 and can have a displacement of ⅜ inches. Thus the needle passes entirely through the bore 236 each time that the valve operates. This ensures that dirt cannot block the bore and prevents scale from being deposited.

In this form, the magnitude of the gap between the knob 92" and the plate 222 determines the distance through which the element 46" can be raised. Furthermore, this gap is greater than the gap between the top of the lower stem part 226 and the lower end of the stem 42". Thus, after the element 46" has been lifted from its seat, the stem part 226 engages the stem 42" and forces it and hence the central part of the diaphragm 114 upwardly thereby forcing water to flow from the chamber 34".

As a consequence, reliance is not placed on inlet pressure to obtain movement of the diaphragm 114 and the valve is capable of operating on low inlet pressures e.g., 4 p.s.i.

The effective area of the bore 236, while the needle 82" is in the bore, is the area of the bore less the cross-sectional area of the needle. As the needle leaves the bore, its full area becomes effective and thus the closing characteristics of the valve can be predetermined. The loose fit of the rod-like part 232 in the bore 228 allows this part to tilt freely. Thus the inside surface of the insert 234 can readily guide the needle 82" into the bore 236.

The plate 118 can be moulded of flexible plastics material and formed with two radially extending fingers 238. At their outer ends the fingers join the remainder of the plate and these connections form hinges. The inner ends of the fingers have arcuate cut outs so that they fit around the stem part 230 and press resiliently downwardly on the upper end of the element 46'. These fingers thus replace the spring 122.

I claim:

1. A shower valve comprising a casing having an inlet and an outlet, a shower rose at the outlet, a chamber having a movable wall part, a restricted inlet to the chamber, said restricted inlet communicating with the inlet to the casing, an outlet from the chamber, a valve seat and co-operating valve closure element for normally closing said outlet from the chamber, a valve actuating element for sequentially displacing the valve closure element from its seat to open said outlet and urging the movable wall part in the direction which reduces the volume of said chamber, said actuating element projecting from the casing through said rose to form an accessible push button by means of which said valve closure element and the movable wall can be sequentially displaced, and a valve surface and co-operating valve seat for controlling flow from the casing inlet to the casing outlet, the seat and surface being arranged to separate as said movable wall part moves in said direction.

2. A liquid flow control valve comprising a casing defining a main chamber, a main inlet to and a main outlet from said main chamber, a control chamber within said main chamber and bounded by a movable component of resilient material and a fixed wall part, said component being secured to said fixed wall part and having a base portion in the form of a frusto-conical diaphragm exposed internally to pressure within the control chamber and externally to pressure in the main chamber, a plate within the control chamber, said plate being secured to said diaphragm at the central region of the diaphragm and having a frusto-conical shape commensurate with the shape that the diaphragm adopts while the valve is closed so that, while the valve is in its closed condition, the plate is in face-to-face contact with the inner surface of the diaphragm over substantially the entire area of the diaphragm, said diaphragm having freedom to move from said position it adopts when the valve is closed to a position in which the conical angle is reversed, a restricted inlet to said control chamber, said restricted inlet communicating with said main inlet, an outlet from said control chamber which outlet passes through said central region of said diaphragm and through said plate, a valve closure element normally closing said outlet from said control chamber, a valve seat, a valve surface on said component co-operating with said valve seat to control flow through the valve from said main inlet to said main outlet, said surface and seat separating to initiate flow through the valve when said centre region is displaced in the direction which reduces the volume of said chamber after opening of said outlet from the control chamber.

3. A valve according to claim 2, in which a stem projects from said diaphragm on the side thereof remote from said control chamber, said stem having a passage therethrough which constitutes said outlet from said control chamber.

4. A valve according to claim 3, in which said passage in the stem is stepped to form a seat, and said valve element co-operates with this seat.

5. A valve according to claim 3, in which said co-operating valve surface is an external peripheral surface of the stem.

6. A fluid flow control valve comprising a casing defining a main chamber, a main inlet to and a main outlet from said main chamber, a control chamber within said main chamber and bounded by a movable component of resilient material and a fixed wall part, said component being secured to said fixed wall part and having a base portion in the form of a frusto-conical diaphragm exposed internally to pressure within the control chamber and externally to pressure in the main chamber, a plate within the control chamber, said plate being secured to said diaphragm at the central region of the diaphragm and having a frusto-conical shape commensurate with the shape that the diaphragm adopts while the valve is closed so that, while the valve is in its closed condition, the plate is in face-to-face contact with the inner surface of the diaphragm over substantially the entire area of the diaphragm, said diaphragm having freedom to move from said position it adopts when the valve is closed to a position in which the conical angle is reversed, a restricted inlet to said chamber, said restricted inlet communicating with said main inlet, an outlet from said control chamber, a valve closure element normally closing said outlet from said control chamber, a valve seat, and a valve surface on said component co-operating with said valve seat to control flow through the valve from said main inlet to said main outlet, said surface and seat separating to initiate flow through the valve when said central region is displaced in the direction which reduces the volume of said control chamber after opening of said outlet from the control chamber.

* * * * *